ROBERT S. KEANE
INVENTOR.

ROBERT S. KEANE
INVENTOR.

United States Patent Office 3,399,689
Patented Sept. 3, 1968

3,399,689
CONTROL VALVE INCLUDING INDEPENDENTLY OPERABLE PILOT VALVES
Robert S. Keane, Placentia, Calif., assignor, by mesne assignments, to Victor Equipment Company, San Francisco, Calif.
Filed Oct. 18, 1965, Ser. No. 497,330
27 Claims. (Cl. 137—220)

ABSTRACT OF THE DISCLOSURE

A control valve in which a main valve mounted in the flow line is actuated by a piston in a valve chamber by line pressure, the chamber having inlet and outlet exhaust ports controlled independently by normally closed pilot valves, which permit selective movement of the valve to any desired open, closed, and intermediate positions, the main valve having pressure areas effective to substantially hydraulically balance the valve in open position and enable regulating flow in the flow line. The valve chamber is also connected through an orifice with a cavity containing a resilient member having an internal void which permits it to deform when an opening shock pressure above normal is applied to the main valve in its closed position, thereby to enable unseating of the valve to relieve the shock pressure.

---

The present invention relates to fluid flow control valves and more particularly to a fluid flow control valve in which line pressure is employed to open and close a main valve as well as to effect the selective positioning of such main valve at any desired position intermediate open and closed.

An object of the invention is to provide a flow control valve wherein line pressure under the control of a pair of pilot valves is applied to the main valve to cause the same to be closed and wherein when the main valve is open the same is substantially hydraulically balanced in selected open positions so as to regulate the flow of fluid past the main valve.

Another object of the invention is to provide a flow control valve comprising main and pilot valves which are so constructed and arranged that water hammer effects may be eliminated or minimized when the main valve is closed.

A further object of the invention is the provision of a main valve mountable in a flow line and subjected to flow line pressure whereby to cause the main valve to be opened and wherein the main valve is hydraulically centered in a main valve chamber so as to assure proper operation of the valve and prevent misalignment of the main valve with the cooperative valve seat.

Still another object is to provide a pilot valve mechanism comprising pilot valves disposed in opposed relation to one another so as to be actuatable against a biasing force provided by a common spring member in the form of a resilient solid spring and wherein the solid spring cooperates with the respective pilot valves to reduce the effect of hydraulic pressures on the pilot valve elements so that the same are substantially hydraulically balanced when open, but the pilot valves being unbalanced when closed so as to be held closed by pressure acting on less than the entire end area of the pilot valves.

An object of the invention is to provide a control valve mechanism wherein a main valve means includes a housing adapted to be supported in a flow line and has a seat defining a flow passage therethrough; a main valve piston is for movement in said flow passage into and out of engagement with said seat; said main valve piston having a first fluid pressure responsive area exposed to the pressure of fluid in said flow passage; means supporting said piston including means defining with said piston a main valve chamber; said main valve piston having a second fluid pressure responsive area exposed to the pressure of fluid in said chamber; a first port being provided in said valve housing and communicating with said flow passage adjacent said seat and in upstream relation thereto; a second port being provided and communicating with said passage downstream in relation to said seat; a third fluid passage being provided and communicating with said main valve chamber; and wherein pilot valve means is provided for controlling the flow of fluid between said first port and said second and third ports to cause said main valve chamber to be subjected to the pressure of the fluid in said flow passage upstream of said seat and to exhaust said main valve chamber downstream from said seat, whereby said main valve piston will be moved by the pressure of fluid in said main valve chamber to a fully closed position and may be held by the fluid in said main valve chamber in selected positions between fully closed and fully opened.

A further object of the invention is to provide a valve construction in which a valve is held on its seat by fluid pressure but is enabled to be moved off of its seat by the provision of a resilient member having an internal void to enable its deformation when opening force is applied to the valve and constituting means for allowing movement of the valve away from the seat and compression of the gas contained within the void. In one case the resilient member herein disclosed is adapted to resiliently hold a pilot valve on its seat in accordance with certain of the preceding objectives and to be deformed so that a hydraulic lock may not hold the pilot valve closed. In another case the resilient member may be employed to enable line pressure responsive movement of a valve off of its seat, for example, only when the line pressure exceeds normal operating levels as would be the case in the event that a high pressure shock wave encounters the valve due to the rapid closing of some other valve within the fluid system causing a water hammer effect.

Other objects and advantages of the invention will be hereinafter described or will become apparent to those skilled in the art, and the novel features of the invention will be defined in the appended claims.

In the accompanying drawings:

FIG. 4 is a fragmentary view in section and on an enlarged scale more particularly illustrating the details of the pilot valve assembly;

Like reference characters in the several views of the drawings and in the following description designate corresponding parts wherein MV generally denotes a main valve assembly and PV generally denotes a pilot valve assembly.

Figure 1:
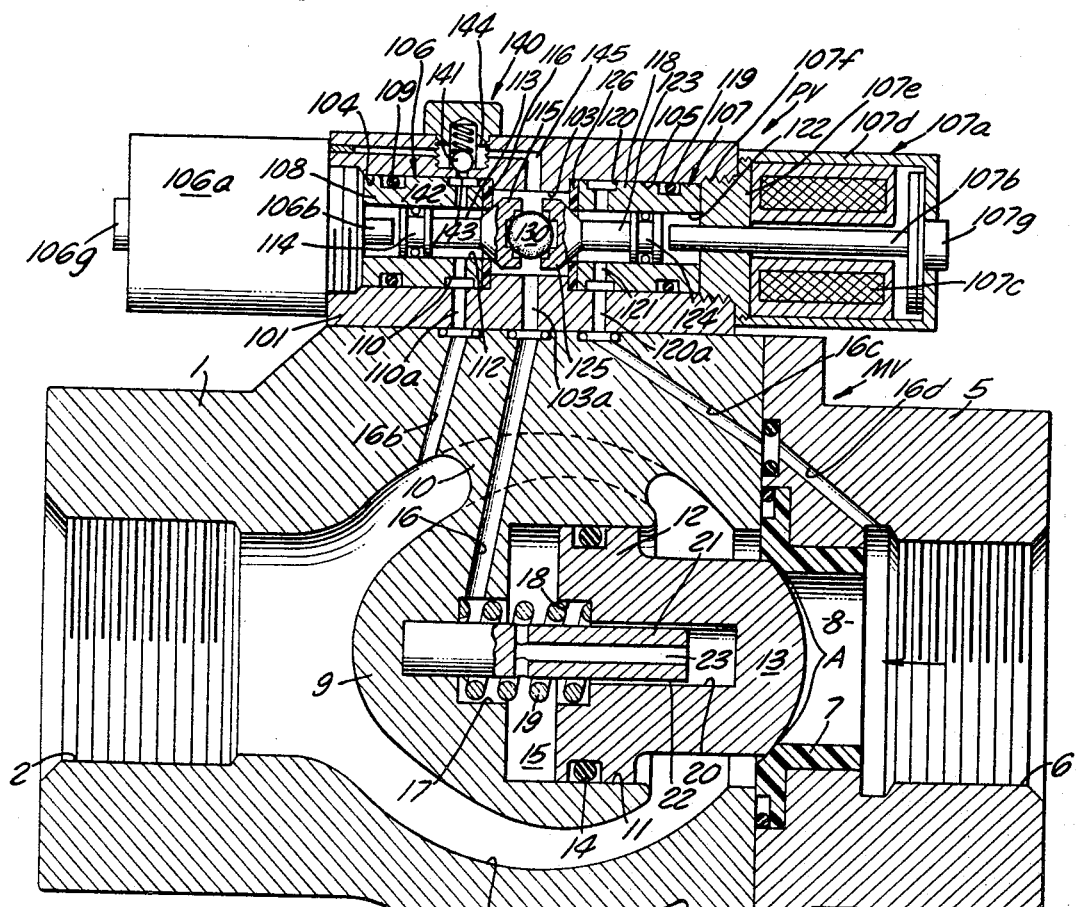
FIG. 1 is a view in longitudinal section through a valve assembly made in accordance with the invention with certain of the parts shown in elevation, the main and pilot valves all being closed.
Figures 2, 3:
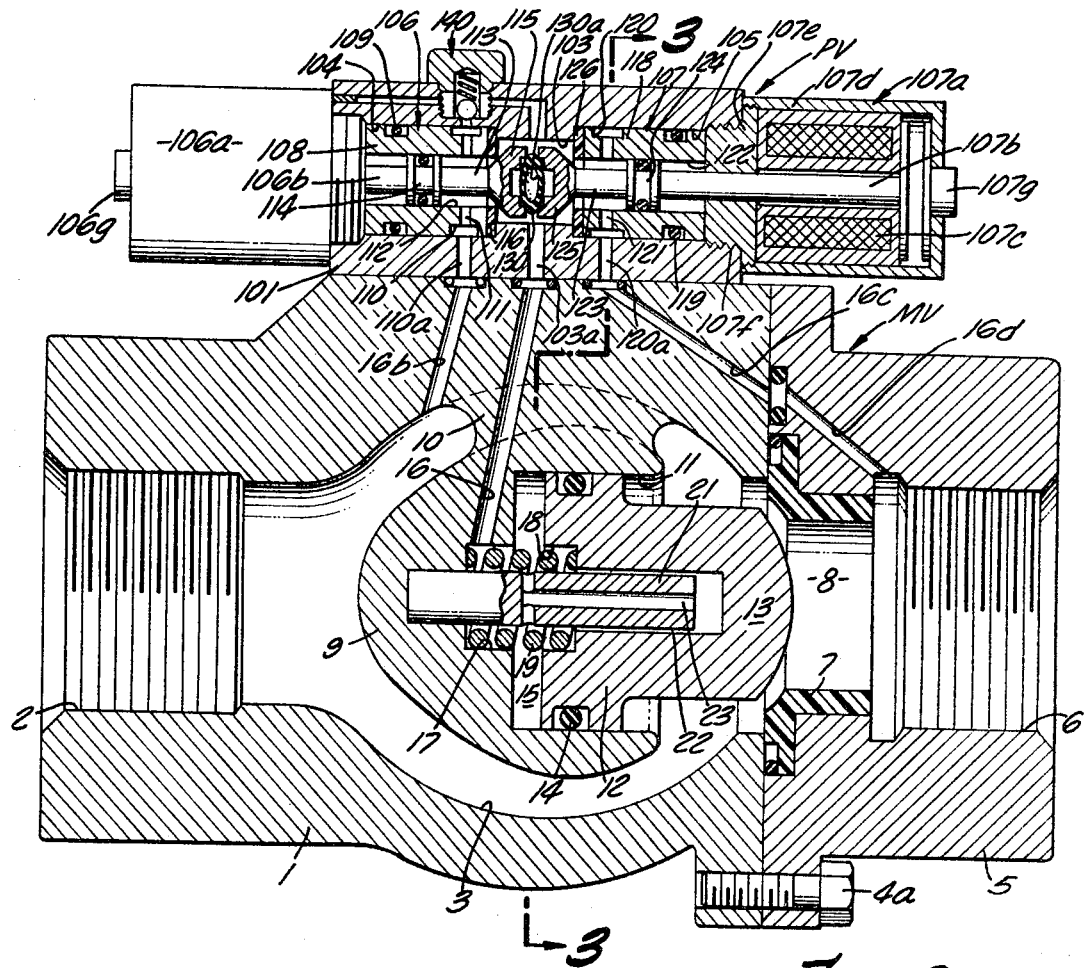
FIG. 2 is a view corresponding to FIG. 1 but showing the main valve in an intermediate open position.
FIG. 3 is a view on a reduced scale and in transverse section as taken on the line 3—3 of FIG. 2.

The main valve assembly MV, as seen in the embodiment of FIGS. 1–3, includes a main valve housing 1 having an outlet 2 adapted for connection in a flow line and having a flow passage 3 therethrough. At the end of the housing opposite the outlet 2 is mounted as by fasteners 4a an adapter 5 having an inlet 6 adapted for connection in the flow line. Adapter 5 carries a valve seat member 7 circumscribing a flow passage 8 which leads into the passage 3 in housing 1 which in turn leads into the passage 2. Preferably, the seat member 7 is composed of "Teflon" or other known resilient material.

A main valve support 9 is disposed within the flow passage 3 and supported by spider means generally denoted at 10. Preferably, the flow passage 3 and the main valve support 9 are streamlined so as to minimize turbulence and so as to provide a flow area equal to or greater than the flow area through the valve seat member 7.

In the main valve support 9 is a bore 11 constituting a cylinder in which a main valve piston 12 is disposed, the piston 12 having thereon a valve head 13 adapted for seating engagement with the valve seat member 7. Disposed about piston 12 is a suitable piston ring in the form of an O-ring designated 14 and between the inner end of the cylinder 11 and the base of the piston 12 is a main valve chamber designated 15 with which communicates a port 16 extended laterally through the housing 1 through one of the spider means 10 and the main valve support 9 into a counterbore 17 in the main valve support. Seating in the counterbore 17 at one end and also seating at the other end in a corresponding counterbore 18 in the main valve piston 12 is a coil spring 19 adapted to impose a closing force on the main valve piston.

Carried by the main valve support 9 and projecting through the counterbore 17, through the chamber 15, and into a reduced diameter bore 20 in the main valve head 13 is a centralizing support 21. It will be noted that the diameter of the reduced bore 20 is such that a space 22 is provided between the centering support 21 and the wall of the reduced bore 20 adapted to contain a film of fluid. In addition, the centering support 21 is provided with a T-passage 23 also providing communication between the chamber 15 and the reduced bore 20 through the centering support 21.

Since, as will hereinafter more fully appear, the pressure in the main valve chamber 15 when the main valve is being actuated to a closed position, or when the main valve is being held in an intermediate position, is a function of the line pressure also applied to the main valve tending to hold the same open, it will be recognized that the pressure of fluid in the space 22 between the centering support 21 and the wall of the bore 20 is also a function of the pressure applied to the main valve. Such pressure is applied to the surface area of the bore 20 to provide a force tending to centralize the main valve, which force is proportional to line pressure. The line pressure is also influential on the tendency of the main valve to be decentralized by pressure conditions which vary at different regions of the annular area of the main valve exposed to line pressure either as a consequence of peculiar flow conditions, turbulence, or the like, and which may impose on the main valve a pressure at one angular location greater than at another angular location whereby the main valve has a tendency to be decentralized. Thus, pin or support 21 and bore 20 constitute cooperative pressure responsive means for centralizing the main valve piston.

It will now be understood that the main valve assembly is one which when closed as shown in FIG. 1 exposes a minor area A to the pressure of fluid within the passage 8 in the valve seat member 7 and which exposes the entire area of the piston 12 within the chamber 15 to the pressure of fluid in such chamber, this entire area being major relative to minor area A. On the other hand, as seen in FIG. 2 when the main valve is open, it exposes equal areas to the static and velocity pressures in the flow passage 3 externally of the valve support 9 and to the pressure of fluid in the chamber 15 internally of the valve support 9. In the illustrative embodiment the spring 19 also provides a force serving to augment the force derived from the pressure in chamber 15 acting on the entire cross sectional area of the main valve piston tending to close the main valve.

Therefore, in accordance with the objectives of the invention, in order that the main valve may be either closed or fully opened or maintained in any selected position intermediate opened or closed, the pilot valve means PV is adapted to control the admission and exhaust of fluid to and from the chamber 15 so that the pressure of the fluid in the chamber may be of such magnitude as to cause the main valve to be fully closed or the volume of the fluid in the chamber 15 may be reduced so that the main valve will be moved by the action of line pressure on the minor area A to an open position as shown in FIG. 2 and thereafter moved by the action of line pressure across the entire cross sectional area of the main valve exposed in flow passage 3 to selected open positions in which more or less flow through the main valve assembly will be permitted.

The pilot valve assembly accordingly comprises a housing 101 adapted to be secured to the housing 1 of the main valve as by means of fasteners 102, as best seen in FIG. 3. Within the housing 101 is a central pilot valve chamber 103 and at opposite sides of the chamber the housing 101 is bored as at 104 and 105 to respectively provide for the assembly in the housing of an exhaust pilot valve assembly generally denoted at 106 and an inlet pilot valve assembly 107.

Each of the pilot valve assemblies 106 and 107 in the illustrative embodiment is like the other and, referring to the exhaust pilot valve assembly 106, it will be seen to comprise a barrel 108 disposed in the bore 104 with sealing means 109 therebetween. About the outer periphery of the barrel 108 is an annulus 110 having connection with a suitable number of radial ports 111 which lead into a central bore 112. Within the bore 112 is a reciprocal pilot valve stem 113 having at one end a piston 114 disposed in the bore 112 and at its other end a head 115 adapted to engage a seat member 116 at the inner end of the barrel 108. This seat member is also preferably composed of "Teflon" or other resilient material.

Likewise, the inlet pilot valve assembly 107 comprises a barrel 118 disposed in the bore 105 with a seal 119 therebetween, the barrel 118 having an annulus 120 about its outer periphery communicating through radial ports 121 with a central bore 122 through the barrel 118. An inlet pilot valve stem 123 is reciprocal in the bore 122, the valve 123 having at one end a piston 124 and on its other end a head 125 engageable with a seat 126 disposed at the inner end of the barrel 118.

Referring now more particularly to the enlarged showing of FIG. 4, the respective pilot valve elements 113 and 123 may be typified as poppet valves and, therefore, the valve heads 115 and 125 are in the characteristic form of a poppet valve head having, respectively, conical seating surfaces 115a and 125a. In addition, each of the valve heads 115 and 125 is provided with an axially extended skirt 115b and 125b forming cavities 115c and 125c in the respective pilot valve heads, such cavities being defined by walls 115d and 125d, respectively, which are of the same diameter as the bores 112 and 122 in the barrels 108 and 118.

Inwardly of the wall 115d each of the pilot valve heads is also provided with a shallow seat 115e and 125e, respectively, of a diameter equal to the diameter of the pilot valve stems 113 and 123, all for a purpose which will hereinafter more fully appear.

Interposed between the opposing pilot valve heads 115 and 125 is a spring means in the form of a deformable elastic member illustrated as a sphere 130 composed of neoprene, rubber, or other suitable material. The sphere 130 is of a size such that it will seat in the respective central cavities 115e and 125e in engagement with the annular edge defined at the juncture of the peripheral walls of cavities 115e and 125e with the base walls of recesses 115c and 125c, when the pilot valves are in the closed position as shown in FIG. 1. As shown in FIG. 2 and in broken lines in FIG. 4, when either of the pilot valves is moved one toward the other, the spring sphere 130 will be deformed into sealing engagement with the annular edge defined at the outer extremity of the annular walls 115d and 125d, also for a purpose which will be hereinafter more fully described.

Actuator means for the respective pilot valves 106 and 107 are provided and, in the illustrative embodiment, such actuator means respectively comprise solenoid assemblies 106a and 107a. Each of the solenoid assemblies has a core designated 106b and 107b, respectively, such cores being operable by an armature as indicated at 107c in respect of the solenoid assembly 107a. Each solenoid assembly also includes an outer case as indicated at 107d formed on or suitably attached to a base 107e adapted as at 107f to be threaded into the pilot valve housing 101 for the purpose of both securing the solenoid assembly to the housing 101 and to retain the respective pilot valve assemblies within the housing 101.

Suitable control circuitry, not shown, may be employed for energizing the solenoid assemblies to cause actuation of the armatures to effect movement of the pilot valve elements one toward the other as may be desired in the control of the functioning of the valve assembly. It will be understood that such control means may be simple switches or may include pressure or flow responsive monitoring means for automatically controlling the solenoids.

In addition, means may be provided for manually actuating the pilot valve elements. In the latter connection it will be noted that the respective solenoid assemblies are provided with a push button as indicated at 107g in assembly 107a, projecting from the outer end of the case 107c and being formed on or made a part of a disc 107h adapted to engage a disc 107j at the outer end of the solenoid armature 107b so that the depression of the button 107g will move the solenoid armature inwardly into engagement with the piston 124 of pilot valve stem 123 so as to move the pilot valve head off its seat. A similar construction, not shown in detail, may obviously be employed in the solenoid assembly 106a which is shown in elevation in the several figures of the drawings and wherein the manual push button is designated 106g.

As previously indicated, it is the purpose of the pilot valve assembly PV to admit fluid under pressure to the main valve chamber 15 and to allow the exhaust of fluid from the main valve chamber 15 as may be desired to enable the opening, the closing, and the intermediate positioning of the main valve piston. Accordingly, the pilot valve housing has an outlet port 110a communicating with the annulus 110 of barrel 108 and an inlet port 120a communicating with the annulus 120 of barrel 118. The pilot valve housing also has a port 103a leading to the pilot valve chamber 103. The respective ports 110a, 120a, and 103a, as just described, are located at the side of the respective pilot valve assemblies adjacent the main valve housing 1 so as to communicate with ports of the main valve housing.

In this connection, the main valve housing, as previously described, has the port 116 leading to the main valve chamber 115, and the pilot valve port 103 communicates with the main valve port 116 so that fluid may communicate between the main and pilot valve chambers 15 and 103. The pilot valve outlet port 110a communicates with a port 16b in the main valve housing 1 which leads into the flow passage 3 through the latter adjacent to one of the webs 10 which mount the main valve support 9 in the flow passage 3. More specifically, the port 16b opens into the flow passage 3 in alignment with the web 10 so as to be partially shielded by the web 10 and, therefore, subjected to a pressure drop caused by the flow of fluid through passage 3 about web 10.

The main valve housing 1 also has port 16c leading to pilot valve inlet port 120a and port 16c communicates with a port 16d in the adapter 5 so as to establish communication between the inlet passage 6 of the valve assembly and the inlet port 120a of the pilot valve assembly. More particularly, it will be noted that the port 16d communicates with the valve inlet passage 6 at a location closely adjacent to the main valve seat member 7 so that the fluid in the inlet passage 6 may pass into the port 16d from a location substantially as close as possible to the main valve seat, for a purpose which will hereinafter be more fully described.

In the operation of the valve as thus far described, it will be understood that the position of the main valve 13 will be a function of the pressure acting on the opposite ends of the main valve piston 12. Under the control of the pilot assembly 107 which controls the passage of fluid from the inlet passage 6 through port 16d, port 16c, port 120a, annulus 120, ports 121, past pilot valve head 125, into chamber 103, through port 103a, and port 16 to the main valve chamber 15, the pressure within the main valve chamber 15 may be equalized with the pressure of the upstream side of the main valve. Under the control of the pilot valve assembly 106, the volume of fluid within the main valve chamber 15 may be controlled by the exhaust of such chamber 15 through port 16, port 103a, pilot valve chamber 103, ports 115, annulus 110, port 110a, and exhaust port 16b in the main valve housing. Accordingly, it will now be recognized that so long as the force applied to the main valve 13 by fluid pressure in chamber 15 exceeds the force applied by line pressure to main valve 13, the the main valve will remain closed, in which condition line pressure is subjected only to the minor area A within the seat diameter of the main valve seat member 7. When both pilot valves are closed and the main valve is also closed, it will be recognized that the pressure of fluid in chamber 15 acting on the main valve to hold it closed will be the reaction pressure caused by the line pressure being applied to the minor area A.

When it is desired that the valve be fully opened, it is only necessary to actuate solenoid assembly 106a or manually actuate button 106g so as to cause the exhaust pilot valve head 115 to be moved from its seat 116 so that fluid within the main valve chamber 15 will be exhausted to the downstream side of the main valve assembly, relieving the fluid from the chamber 15 so that line pressure across the minor area A will unseat the main valve and thereafter line pressure acting across the entire cross sectional area of the main valve will move the latter to a fully open position.

If it be desired that the main valve be only partially opened and retained in some selected position intermediate fully open and fully closed, then the solenoid 106a or the manual button 106g may be momentarily actuated to momentarily open exhaust pilot valve assembly 106 to allow a partial exhaust of the body of fluid within the main valve chamber 15 through the exhaust porting previously described. Thereafter, upon closure of the exhaust pilot valve assembly 106, further opening of the main valve will be precluded.

If it be desired that the main valve be slightly more closed or fully closed, then the inlet pilot valve assembly 107 may be solenoid operated or push button operated so as to allow the admission of a further quantity of line fluid to the main valve chamber 15 under line pressure so as to cause movement of the main valve toward the seat, either partially or wholly into engagement with the seat.

The structure of the pilot valve assembly as previously described and the location of the inlet and exhaust port leading between the inlet passage and outlet passage of the main valve assembly through the pilot valve assembly is such that certain additional advantages accrue in respect of valve operation and in respect of elimination of objectionable water hammer effects. In this connection and with reference to FIG. 4, it will be noted that each of the pilot valve assemblies and more particularly the poppet valve members thereon is unbalanced when closed so that fluid pressure within the main valve chamber 15, which fluid pressure is a function of line pressure tending to move the main valve toward an open position, is applied to a differential area on each pilot valve poppet so as to hold the latter on its seat. Such differential area is effectively the annular area B provided at the surface lying at the base of recesses 115c and 125c between the walls 115d and 125d of the pilot valve poppets and the annular edge of the base of recesses 115c and 125c where such annular edges engage the resilient spring sphere 130. Otherwise it will be observed that the opposing fluid pressure responsive areas of the respective poppet pilot valves are equal.

Thus, there is a normal tendency of the pilot poppets toward a closed position caused by spring pressure applied by sphere 130 and fluid pressure applied to annular area B so long as the poppets are closed. In order that the pilot valve poppets be comparatively insensitive to the magnitude of pressure when open and thus facilitating opening of the respective pilot poppets, the resilient spring sphere 130, as shown in FIG. 2 and as shown in broken lines in FIG. 4, act to effectively seal off from pressure within pilot valve chamber 103 the just described annular area B so that the pilot valve poppets when open are substantially hydraulically balanced and therefore subject to operation with low actuating forces, notwithstanding the magnitude of pressure in the chamber.

In addition to the foregoing, water hammer effects caused by closure of the main valve may be substantially eliminated by virtue of the fact that fluid under pressure for effecting main valve closure is derived from a location, namely port 16d, closely adjacent to the valve seat at a point which is the point of origin of the shock waves of sonic velocity which are normally caused by closure of a valve. In other words, the static and velocity pressures of the line fluid are applied to the main valve within the chamber 15 through the inlet porting as described above at a rate which is somewhat delayed so that the just noted shock waves of sonic velocity may be allowed to travel through the line leading to the inlet port 6 and return to be applied to the main valve during a period which is less than the period required for the closing pressures acting on the main valve to effect full valve closure. As a consequence, the shock pressure at sonic velocity will be dissipated through the main valve.

As previously described, both the main valve seat member 7 and the pilot valve seat members 116 and 126 are composed of resilient material such as "Teflon" so that even though the pilot valve heads 115 and 125 are unbalanced and hydraulically held upon their seats when the main valve is either held fully closed or in some intermediate position by fluid trapped within the main valve chamber 15 and the pilot valve assemblies, the pilot valves are not inherently subjected to a hydraulic "lock," i.e., some displacement may occur in either of the pilot valve seats or in the main valve seat to enable the initial unseating of either of the pilot valves, depending upon whether it is desired that the main valve be allowed to open or be further closed. Such hydraulic lock may also be avoided by otherwise providing for displacement of liquid in main valve chamber and pilot valve chamber 115 and 103, respectively, as by the provision of an air space within the pilot valve spring member 130, as indicated at 130a. Under such circumstances it will also be understood that the force necessary to actuate the pilot valves under conditions of line pressure which will remain substantially constant may be varied by varying the ability of the spring member 130 and/or the seats 7, 115, 125 to be deformed, that is, the resiliency of these seating members and spring member may be varied to suit different operating conditions.

In addition, the resilient sphere 130, as best seen in FIG. 4, upon assembly of the pilot valve means will engage the annular edge formed at the inner periphery of walls 115d and 125d thereby sealing cavities 115e and 125e against the admission of line fluids when the valve is placed in service. It will be understood in this connection that assembly of the pilot valve means would ordinarily place the sphere 130 under initial slight compression when both pilot valves are closed. Thus, the cavities 115e and 125e also afford an air filled space into which the sphere 130 may be deformed to avoid a condition of hydraulic lock within the pilot valve chamber 103. In any event, even though cavities 115e and 125e may ultimately fill with liquid the other deformable elements described just above will preclude hydraulic locking of the pilot valve means.

Means are also incorporated in the assembly as described above for the prevention of backflow through the main valve assembly, i.e., flow in a direction opposing the arrows as shown in FIG. 1. Such means generally comprises a check valve assembly denoted at 140, including a spring biased ball check valve 141 engaging a seat 142 circumscribing a port 143 which communicates between a check valve chamber 144 and the annulus 110 formed about the pilot valve barrel 108. Leading from the check valve chamber 144 is a port 145 which opens into the pilot valve chamber 103. When the pilot valves 115 and 125 are closed and the volume of fluid in the main valve chamber 15 is such that the main valve would ordinarily be held open to some degree responsive to the application of fluid pressure to the main valve piston outside the chamber 15, the main valve would likewise ordinarily be held open in the event of attempted reverse flow through the main valve housing. In view of the backflow preventing means just referred to, however, backflow will be prevented inasmuch as the backflow pressure will move ball check valve 141 off its seat, allowing such backflow pressure to find access through port 145 into the pilot valve chamber 103 and thence into the main valve chamber 15 so that a superior closing force will be applied to the main valve piston and the main valve will be closed to shut off such backflow.

Under such circumstances, it will be understood that when it is desired that flow be resumed in the direction of the arrows in FIG. 1, the fluid in the main valve chamber will hold the main valve closed until the pilot valve mechanism is actuated again to wholly or partially bleed off from the main valve chamber 15 a quantity of the fluid therein to allow pressure responsive opening of the main valve.

Figure 5:
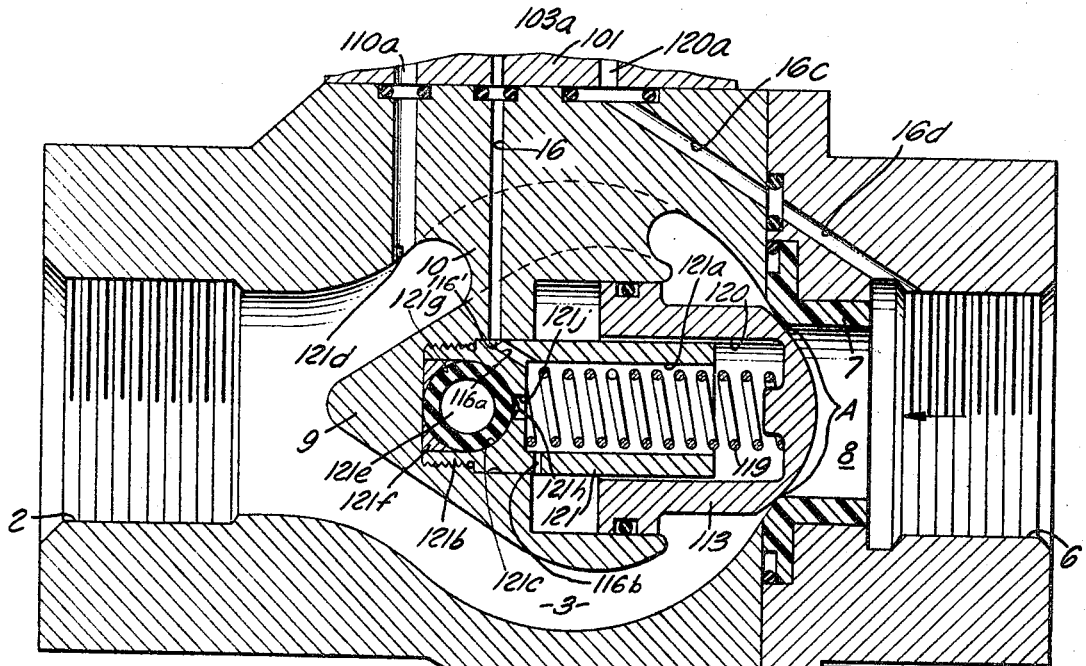
FIG. 5 is a fragmentary view in section generally corresponding to FIG. 1, but showing a modified main valve construction.
Figure 6:
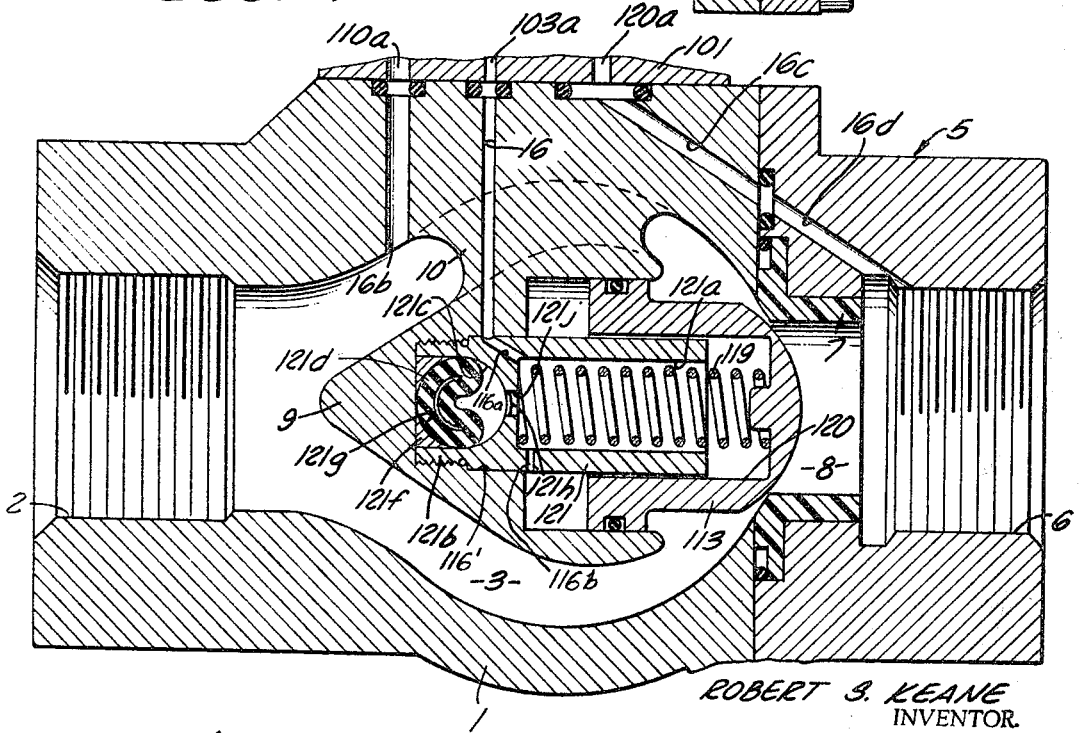
FIG. 6 is a view corresponding to FIG. 5, but showing the main valve moved off its seat responsive to abnormally high line pressure.

Referring now to FIGS. 5 and 6, a modified main valve construction is illustrated and in respect of the main valve housing and support structure as well as the seat assembly, the same reference characters are applied as in the case of FIGS. 1–3. In FIGS. 5 and 6 the modified main valve construction, in accordance with the objects of the invention, is made in such a fashion that in response to high pressure shock waves in the line fluid within the flow passage 8 impinging upon the area A of the main valve piston, designated 113 in this embodiment, the main valve piston 113 will be moved off of its seat, that is, from the closed position of FIG. 5 to the open position of FIG. 6, to allow the dissipation of the shock pressure wave through the flow passage.

Accordingly, the centering pin or support 121 for the main valve piston 113 is somewhat modified as compared with the first described embodiment and comprises a cup-like pin having a cavity 121a in which a coil spring 119 seats at one end, the other end of the spring engaging in the bore 120 of the main valve piston 113, so as to normally apply a biasing force tending to close the main valve. At the inner end of the cup-like member 121 is an externally threaded, hollow stem section 121b adapted to be threadedly engaged with the main valve support 9. Within the stem section 121b is a hemispherical seat 121c for surface engagement with a deformable sphere 121d having a wall providing a void 121e therein. In addition, an annular member 121f adapted to closely fit within the hollow stem 121b is formed with a substantially hemispherical surface 121g which also is in surface contact with the sphere 121d so that, as seen in FIG. 5, the latter is contained in a spherical cavity substantially entirely in sealing engagement with said hemispherical surfaces 121c and 121g over its entire outer surface, except for a minor area 121h which is exposed through an orifice 121j to fluid within the bore 120 and within the cup 121a of the support 121.

Fluid under pressure, as in the first described embodiment of the present invention, will, of course, be trapped in the main valve chamber 115 when the pilot valve means are closed, but to enable the flow of fluid into and out of the main valve chamber 115, the cup-like support member 121 is provided with an outer annular groove or passageway 116' which is in communication with a suitable number of diagonally extended passages 116a leading into the cup cavity 121a. From the cavity 121a a suitable number of radial ports 116b lead into the main valve chamber 115.

Under ordinary circumstances it is desired that the modified valve construction now being described will function exactly as does the valve construction first described. Therefore, it is contemplated that the sphere 121d be non-deformable under the ordinary range of line pressures in the system in which the valve is employed. This is to say that the sphere 121d is to be deformed in response to excessively high pressures. Thus, in the assembly and installation of a valve in accordance with FIGS. 5 and 6, the shore hardness of the sphere 121d may be varied and the area of exposure at orifice 121h may be varied so as to vary the pressure at which the sphere will deform, it being notable in this connection that while only a minor area of the sphere is exposed to fluid pressure under normal circumstances, once deformation of the sphere commences, a rapidly increasing area of the sphere will be exposed to fluid pressure and the sphere essentially will collapse, as shown in FIG. 6, to allow displacement of the main valve piston 113 an axial distance represented by the volume of the void 121e within the sphere. Therefore, by variation of the volume of the void 120e, the maximum extent of main valve travel responsive to excessively high pressure may be varied. Preferably, the collapse of the sphere 121d will enable fluid displacement in the main valve chamber to the extent that the main valve will open only slightly providing, for example, the equivalent of a sharp edge orifice.

It will now be recognized that the modified construction of FIGS. 5 and 6 affords a valve structure wherein the main valve 113 will be opened in the event that line pressure upstream of the main valve reaches a level which exceeds the resistance of the sphere 121d to deformation. It is contemplated that in the preferred embodiments of the invention according to FIGS. 5 and 6 the main valve 113 will be moved off its seat to allow the dissipation of such high pressure shock waves as may be caused by the closure in the system of another valve (not shown) which causes the travel through the line leading to the main valve 113 of a high pressure shock wave, i.e., typically a water hammer shock pressure wave.

While the specific details of an illustrative embodiment of the invention have been herein shown and described and certain advantages of the construction also have been pointed out, it will be understood that changes in the structure may be resorted to and other advantages may accrue without departing from the scope of the present invention.

I claim:

1. A control valve mechanism, comprising: main valve means including a housing adapted to be supported in a flow line and having a seat defining a flow passage therethrough; a main valve piston; means supporting said piston for movement in said flow passage into and out of engagement with said seat between fully closed and fully opened positions; said main valve piston having a first fluid pressure responsive area exposed to the pressure of fluid in said flow passage; said means supporting said piston including means defining with said piston a main valve chamber and said main valve piston having a second fluid pressure responsive area exposed to the pressure of fluid in said chamber; a first port in said main valve housing communicating with said flow passage adjacent said seat and in upstream relation thereto; a second port communicating with said passage in downstream relation to said seat; a third port communicating with said main valve chamber; and pilot valve means for controlling the flow of fluid between said first port and third port and for controlling independently the flow of fluid between said second and third ports to cause said main valve chamber to be subjected to the pressure of the fluid in said flow passage upstream of said seat and to exhaust said main valve chamber whereby said main valve piston will be moved by the pressure of fluid in said main valve chamber to a fully closed position and may be held by the fluid in said main valve chamber in selected positions between fully closed and fully opened.

2. A valve assembly as defined in claim 1, wherein said pilot valve means includes a pilot valve chamber in communication with said third port and a pair of independently operable normally closed pilot valves respectively controlling the flow of fluid between said first and second ports and said pilot valve chamber.

3. A valve assembly as defined in claim 1, including a resilient deformable member confined within a cavity having communication with said main valve chamber through a connecting orifice for enabling opening of said main valve when said main valve chamber is full of fluid responsive to the application of line pressure to said main valve above the normal range of operating pressures of said valve assembly.

4. A fluid pressure responsive valve mechanism, comprising: a housing having a flow passage therethrough; means forming a seat circumscribing said flow passage; a main valve support disposed in said flow passage; said support having a main valve chamber therein; a main valve piston reciprocal in said chamber into and out of engagement with said seat; port means in said housing and in said main valve support for admitting fluid pressure to and exhausting fluid from said main valve chamber; and means for centralizing said main valve in relation to said seat comprising internal pin and bore means in said support and main valve with said bore means having a closed end; said pin being disposed in said bore in spaced relation thereto for enabling the pressure of fluid in said chamber to act upon said pin and bore means to provide a centralizing force.

5. A fluid pressure responsive valve mechanism as defined in claim 4, wherein said pin is carried by said main valve support; said piston having said bore therein.

6. A fluid pressure responsive valve mechanism as defined in claim 4, wherein said pin is carried by said main valve support; said piston having said bore therein; and said pin having passage means for enabling the entry of fluid from the valve chamber into said bore.

7. A fluid pressure responsive valve mechanism as defined in claim 4, including deformable means exteriorly of said chamber for enabling said valve to be moved out of engagement with said seat upon the application of fluid pressure to said main valve piston substantially in excess of the pressure of fluid in said chamber.

8. A fluid pressure responsive valve mechanism as defined in claim 4, including deformable means for enabling said valve to be moved out of engagement with said seat upon the application of fluid pressure to said main valve piston substantially in excess of the pressure of fluid in said chamber; said deformable means comprising a deformable sphere exteriorly of said chamber and having a void therein.

9. Pilot valve means for controlling the admission of fluid to and exhaust of fluid from a main valve assembly for controlling the operation of the main valve, comprising: a housing having a pilot valve chamber; a pair of pilot valve means carried by said housing; each of said pilot valve means including a support and a poppet reciprocal in said support and having a head disposed in said valve chamber; means providing a seat engageable by the respective poppet heads; each of said pilot valve supports having passage means communicable with said chamber when the poppet heads of said pilot valve means are unseated; said poppet heads being disposed in opposing relation in said chamber and respectively having areas exposed to the pressure of fluid in said chamber to maintain the respective poppet heads on said seat; and means interposed between said poppet heads for sealing off said area of the respective heads upon opening of either of said pilot valves.

10. A pilot valve assembly as defined in claim 9, wherein said pilot valves respectively have additional areas which are equal and subjected to fluid pressure when the respective pilot valves are open.

11. A pilot valve assembly as defined in claim 9, including actuator means for the respective pilot valves; said actuator means including a solenoid having an armature engageable with the pilot valve to shift said head off its seat; and means for manually shifting said solenoid armature to enable manual movement of said pilot valves off of said seat.

12. A pilot valve assembly as defined in claim 9, wherein the means interposed between said poppet heads for sealing off said area of the respective heads comprises a resilient member; each of said heads having a cavity defined by a peripheral wall engageable by said resilient member upon movement of either of said heads off of its seat.

13. A pilot valve assembly as defined in claim 9, wherein the means interposed between said poppet heads for sealing off said area of the respective heads comprises a resilient member; each of said heads having a cavity defined by a peripheral wall engageable by said resilient member upon movement of either of said heads off of its seat; each of said heads also having a recess defined by a peripheral wall sealingly engaged by said resilient member when said poppet heads are on said seats.

14. A pilot valve assembly as defined in claim 9, wherein the means interposed between said poppet heads for sealing off said area of the respective heads comprises a resilient member; each of said heads having a cavity defined by a peripheral wall engageable by said resilient member upon movement of either of said heads off of its seat; each of said heads also having a recess defined by a peripheral wall sealingly engaged by said resilient member when said poppet heads are on said seats; said resilient member being in the form of a sphere; and said recesses and cavities respectively having annular peripheral walls engageable by said sphere.

15. A pilot valve assembly as defined in claim 9, wherein said means interposed between said poppet heads for sealing off said area of the respective heads comprises a resilient member having a void therein.

16. Pilot valve means for controlling the admission of fluid to and exhaust of fluid from a main valve assembly for controlling the operation of the main valve, comprising: a housing having a pilot valve chamber; a pair of pilot valve means carried by said housing; each of said pilot valve means including a support and a poppet reciprocal in said support and having a head disposed in said pilot valve chamber; means providing a seat engageable by the respective poppet heads; each of said pilot valve supports having passage means communicable with said chamber when the poppet heads of said pilot valve means are unseated; said poppet heads being disposed in opposing relation in said chamber; and a common spring means interposed between said poppet heads and normally holding the same on the seats by forcing the heads apart; said common spring means comprising a body of deformable resilient material.

17. A pilot valve assembly as defined in claim 16, wherein said body of resilient material has a void therein.

18. A valve assembly, including: a housing having a flow passage therein; means defining a valve chamber and a valve head disposed in said chamber and having a fluid pressure responsive surface exposed to the pressure of fluid in said chamber for holding said valve on said seat; means including a resilient, deformable member having a wall providing a void into which said wall is deformable; said member being positioned exteriorly of said chamber but exposed to the pressure of fluid in said chamber and said wall being deformable into said void to allow movement of said valve head off of said seat upon the application of a force to said valve head substantially in excess of the force applied to said valve head by the pressure of fluid in said chamber tending to hold said head on said seat.

19. A valve as defined in claim 18, wherein said deformable member consists of a sphere having said void therein.

20. A valve as defined in claim 18, including cavity forming means having engagement with said deformable member about substantially its entire surface; and means for exposing a restricted area of said surface to the pressure of said fluid in said chamber to initially deform said deformable member.

21. A control valve mechanism, comprising: main valve means including a housing adapted to be supported in a flow line and having a seat defining a flow passage therethrough; a main valve piston; means supporting said piston for movement in said flow passage into and out of engagement with said seat between fully closed and fully opened positions; said main valve piston having a first fluid pressure responsive area exposed to the pressure of fluid in said flow passage; said means supporting said piston including means defining with said piston a main valve chamber and said main valve piston having a second fluid pressure responsive area exposed to the pressure of fluid in said chamber; a first port in said main valve housing communicating with said flow passage adjacent said seat and in upstream relation thereto; a second port communicating with said passage in downstream relation to said seat; a third port communicating with said main valve chamber; pilot valve means for controlling the flow of fluid between said first port and said second and third ports to cause said main valve chamber to be subjected to the pressure of the fluid in said flow passage upstream of said seat and to exhaust said main valve chamber whereby said main valve piston will be moved by the pressure of fluid in said main valve chamber to a fully closed position and may be held by the fluid in said main valve chamber in selected positions between fully closed and fully opened; and back flow preventing valve means in said pilot valve means for enabling the passage of backflow fluid pressure through said pilot valve means to said main valve chamber to effect closure of said main valve means.

22. A control valve mechanism, comprising: main valve means including a housing adapted to be supported in a flow line and having a seat defining a flow passage therethrough; a main valve piston; means supporting said piston for movement in said flow passage into and out of engagement with said seat between fully closed and fully opened positions; said main valve piston having a first fluid pressure responsive area exposed to the pressure of fluid in said flow passage; said means supporting said piston including means defining with said piston a main valve chamber and said main valve piston having a second fluid pressure responsive area exposed to the pressure of fluid in said chamber; a first port in said main valve housing communicating with said flow passage adjacent said seat and in upstream relation thereto; a second port communicating with said passage in downstream relation to said seat; a third port communicating with said main valve chamber; pilot valve means for controlling the flow of fluid between said first port and said second and third ports to cause said main valve chamber to be subjected to the pressure of the fluid in said flow passage upstream of said seat and to exhaust said main valve chamber whereby said main valve piston will be moved by the pressure of fluid in said main valve chamber to a fully closed position and may be held by the fluid in said main valve chamber in selected positions between fully closed and fully opened; backflow preventing means in said pilot valve means for enabling the passage of backflow through said pilot valve means to said main valve chamber to effect closure of said main valve means, said backflow preventing means including a passageway leading from said flow passage to said pilot valve means; and a check valve in said passageway.

23. A control valve mechanism, comprising: main valve means including a housing adapted to be supported in a flow line and having a seat defining a flow passage therethrough; a main valve piston; means supporting said piston for movement in said flow passage into and out of engagement with said seat between fully closed and fully opened positions; said main valve piston having a first fluid pressure responsive area exposed to the pressure of fluid in said flow passage; said means supporting said piston including means defining with said piston a main valve chamber and said main valve piston having a second fluid pressure responsive area exposed to the pressure of fluid in said chamber; a first port in said main valve housing communicating with said flow passage adjacent said seat and in upstream relation thereto; a second port communicating with said passage in downstream relation to said seat; a third port communicating with said main valve chamber; and pilot valve means for controlling the flow of fluid between said first port and said second and third ports to cause said main valve chamber to be subjected to the pressure of the fluid in said flow passage upstream of said seat and to exhaust said main valve chamber whereby said main valve piston will be moved by the pressure of fluid in said main valve chamber to a fully closed position and may be held by the fluid in said main valve chamber in selected positions between fully closed and fully opened, said pilot valve means including a pilot valve chamber in communication with said third port and a pair of pilot valves respectively controlling the flow of fluid between said first and second ports and said pilot valve chamber, said pilot valves each including a head disposed in said chamber and a seat engageable by said head for controlling the flow of fluid between said chamber and said first and second ports, and said pilot valve heads being in opposing relation and each having fluid pressure responsive areas for maintaining the same in engagement with the respective seats.

24. A control valve mechanism, comprising: main valve means including a housing adapted to be supported in a flow line and having a seat defining a flow passage therethrough; a main valve piston; means supporting said piston for movement in said flow passage into and out of engagement with said seat between fully closed and fully opened positions; said main valve piston having a first fluid pressure responsive area exposed to the pressure of fluid in said flow passage; said means supporting said piston including means defining with said piston a main valve chamber and said main valve piston having a second fluid pressure responsive area exposed to the pressure of fluid in said chamber; a first port in said main valve housing communicating with said flow passage adjacent said seat and in upstream relation thereto; a second port communicating with said passage in downstream relation to said seat; a third port communicating with said main valve chamber; pilot valve means for controlling the flow of fluid between said first port and said second and third ports to cause said main valve chamber to be subjected to the pressure of the fluid in said flow passage upstream of said seat and to exhaust said main valve chamber whereby said main valve piston will be moved by the pressure of fluid in said main valve chamber to a fully closed position and may be held by the fluid in said main valve chamber in selected positions between fully closed and fully opened, said pilot valve means including a pilot valve chamber in communication with said third port and a pair of pilot valves respectively controlling the flow of fluid between said first and second ports and said pilot valve chamber, said pilot valves each including a head disposed in said chamber and a seat engageable by said head for controlling the flow of fluid between said chamber and said first and second ports, said pilot valve heads being in opposing relation and having fluid pressure responsive areas for maintaining the same in engagement with the respective seats; and means coengaged with the respective pilot valve heads for sealing off a portion of said fluid pressure responsive area when either of said pilot valve heads is moved from its seat.

25. A control valve mechanism, comprising; main valve means including a housing adapted to be supported in a flow line and having a seat defining a flow passage therethrough; a main valve piston; means supporting said piston for movement in said flow passage into and out of engagement with said seat between fully closed and fully opened positions; said main valve piston having a first fluid pressure responsive area exposed to the pressure of fluid in said flow passage; said means supporting said piston including means defining with said piston a main valve chamber and said main valve piston having a second fluid pressure response area exposed to the pressure of fluid in said chamber; a first port in said main valve housing communicating with said flow passage adjacent said seat and in upstream relation thereto; a second port communicating with said passage in downstream relation to said seat; a third port communicating with said main valve chamber; pilot valve means for controlling the flow of fluid between said first port and said second and third ports to cause said main valve chamber to be subjected to the pressure of the fluid in said flow passage upstream of said seat and to exhaust said main valve piston will be moved by the pressure of fluid in said main valve chamber to a fully closed position and may be held by the fluid in said main valve chamber in selected positions between fully closed and fully opened, said pilot valve means including a pilot valve chamber in communication with said third port and a pair of pilot valves respectively controlling the flow of fluid between said first and second ports and said pilot valve chamber, said pilot valves each including a head disposed in said chamber and a seat engageable by said head for controlling the flow of fluid between said chamber and said first and second ports, said pilot valve heads being in opposing relation and each having fluid pressure responsive areas for maintaining the same in engagement with the respective seats; and a resilient member interposed between the respective pilot valve heads, said resilient member having a void therein.

26. A control valve mechanism, comprising: main valve means including a housing adapted to be supported in a flow line and having a seat defining a flow passage therethrough; a main valve piston; means supporting said piston for movement in said flow passage into and out of engagement with said seat between fully closed and fully opened positions; said main valve piston having a first fluid pressure responsive area exposed to the pressure of fluid in said flow passage; said means supporting said piston including means defining with said piston a main valve chamber and said main valve piston having a second fluid pressure responsive area exposed to the pressure of fluid in said chamber; a first port in said main valve housing communicating with said flow passage adjacent said seat and in upstream relation thereto; a second port communicating with said passage in downstream relation to said seat; a third port communicating with said main valve chamber; pilot valve means for controlling the flow of fluid between said first port and said second and third ports to cause said main valve chamber to be subjected to the pressure of the fluid in said flow passage upstream of said seat and to exhaust said main valve chamber whereby said main valve piston will be moved by the pressure of fluid in said main valve chamber to a fully closed position and may be held by the fluid in said main valve chamber in selected positions between fully closed and fully opened, said pilot valve means including a pilot valve chamber in communication with said third port and a pair of pilot valves respectively controlling the flow of fluid between said first and second ports and said pilot valve chamber, said pilot valves each including a head disposed in said chamber and a seat engageable by said head for controlling the flow of fluid between said chamber and said first and second ports, said pilot valve heads being in opposing relation and each having fluid pressure responsive areas for maintaining the same in engagement with the respective seats; and a resilient sphere interposed between said pilot valve heads for biasing the same towards the respective seats.

27. A control valve mechanism, comprising: main valve means including a housing adapted to be supported in a flow line and having a seat defining a flow passage therethrough; a main valve piston; means supporting said piston for movement in said flow passage into and out of engagement with said seat between fully closed and fully opened positions; said main valve piston having a first fluid pressure responsive area exposed to the pressure of fluid in said flow passage; said means supporting said piston including means defining with said piston a main valve chamber and said main valve piston having a second fluid pressure responsive area exposed to the pressure of fluid in said main valve chamber; a first port in said main valve housing communicating with said flow passage adjacent said seat and in upstream relation thereto; a second port communicating with said passage in downstream relation to said seat; a third port communicating with said main valve chamber; pilot valve means for controlling the flow of fluid between said first port and said second and third ports to cause said main valve chamber to be subjected to the pressure of the fluid in said flow passage upstream of said seat and to exhaust said main valve chamber whereby said main valve piston will be moved by the pressure of fluid in said main valve chamber to a fully closed position and may be held by the fluid in said main valve chamber in selected positions between fully closed and fully opened, said pilot valve means including a pilot valve chamber in communication with said third port and a pair of pilot valves respectively controlling the flow of fluid between said first and second ports and said pilot valve chamber, said pilot valves each including a head disposed in said chamber and a seat engageable by said head for controlling the flow of fluid between said chamber and said first and second ports, said pilot valve heads being in opposing relation and each having fluid pressure responsive areas for maintaining the same in engagement with the respective seats; and a resilient sphere interposed between said pilot valve heads for biasing the same towards the respective seats, each of said pilot valve heads having a depression sealingly engaged by a portion of said sphere to provide a chamber into which said sphere may be deformed.

References Cited

UNITED STATES PATENTS

| | | | |
|---|---|---|---|
| 595,061 | 12/1897 | Gulland | 251—25 |
| 1,005,703 | 10/1911 | Goeddel | 251—43 |
| 1,595,755 | 8/1926 | Brooks et al. | 137—596.17 |
| 2,314,860 | 3/1943 | Lenin | 137—596.17 X |
| 2,925,984 | 2/1960 | Kowalski | 251—30 X |
| 2,841,359 | 7/1958 | Berck | 137—219 X |
| 3,340,773 | 9/1967 | Franz | 137—596.17 X |
| 3,177,889 | 4/1965 | Hardison | 137—220 |

FOREIGN PATENTS

| | | |
|---|---|---|
| 207,940 | 5/1957 | Australia. |
| 616,350 | 3/1961 | Canada. |
| 1,054,190 | 10/1953 | France. |

ARNOLD ROSENTHAL, *Primary Examiner.*

UNITED STATES PATENT OFFICE
CERTIFICATE OF CORRECTION

Patent No. 3,399,689 September 3, 1968

Robert S. Keane

It is certified that error appears in the above identified patent and that said Letters Patent are hereby corrected as shown below:

Column 2, line 4, after "said", second occurrence, insert -- main --. Column 14, line 13, after "and" insert -- each --; line 40, after "valve" insert -- chamber whereby said main valve --.

Signed and sealed this 10th day of March 1970.

(SEAL)
Attest:

Edward M. Fletcher, Jr.
Attesting Officer

WILLIAM E. SCHUYLER, JR.
Commissioner of Patents